United States Patent
Saxena et al.

(10) Patent No.: US 11,288,784 B1
(45) Date of Patent: Mar. 29, 2022

(54) AUTOMATED METHOD AND APPARATUS FOR IDENTIFYING WHETHER A FIRST VIDEO IS A CONTENT-IDENTICAL VARIANT OF A SECOND VIDEO WHEN IMAGE FRAMES OF EITHER THE FIRST VIDEO OR THE SECOND VIDEO INCLUDE AT LEAST ONE BLACK BORDER

(71) Applicant: Alphonso Inc., Mountain View, CA (US)

(72) Inventors: Aseem Saxena, Uttar Pradesh (IN); Pulak Kuli, Assam (IN); Tejas Digambar Deshpande, Maharashtra (IN); Manish Gupta, Bangalore (IN)

(73) Assignee: ALPHONSO INC., Mountain View, CA (US)

( * ) Notice: Subject to any disclaimer, the term of this patent is extended or adjusted under 35 U.S.C. 154(b) by 0 days.

(21) Appl. No.: 17/477,109

(22) Filed: Sep. 16, 2021

(51) Int. Cl.
| | |
|---|---|
| *G06T 5/50* | (2006.01) |
| *H04N 7/01* | (2006.01) |
| *G06V 20/40* | (2022.01) |

(52) U.S. Cl.
CPC .............. *G06T 5/50* (2013.01); *G06V 20/41* (2022.01); *G06V 20/46* (2022.01); *G06V 20/48* (2022.01); *H04N 7/0122* (2013.01); *G06T 2207/20132* (2013.01)

(58) Field of Classification Search
CPC . G06T 5/50; G06T 2207/20132; G06V 20/41; G06V 20/46; G06V 20/48; H04N 7/0122
See application file for complete search history.

(56) References Cited

U.S. PATENT DOCUMENTS

| | | | |
|---|---|---|---|
| 6,947,097 B1 | 9/2005 | Joanblanq | |
| 6,985,623 B2 | 1/2006 | Prakash et al. | |
| 8,498,487 B2 * | 7/2013 | Singh | G06K 9/6201 382/201 |
| 9,060,106 B1 * | 6/2015 | Wu | G06T 7/0002 |

(Continued)

FOREIGN PATENT DOCUMENTS

| | | |
|---|---|---|
| CN | 107464251 A | 12/2017 |
| JP | 2008036882 A | 2/2008 |

OTHER PUBLICATIONS

Carreira et al., Automatic Letter/Pillarbox Detection for Optimized Display of Digital TV, International Conference on Signal Processing and Multimedia Applications, 8 pages, Aug. 2014. (Year: 2014).*

Carreira et al., Automatic Letter/Pillarbox Detection for Optimized Display of Digital TV, International Conference on Signal Processing and Multimedia Applications, 8 pages, Aug. 2014.

(Continued)

*Primary Examiner* — Phuoc Tran
(74) *Attorney, Agent, or Firm* — Panitch Schwarze Belisario & Nadel LLP

(57) ABSTRACT

An automated method and apparatus are provided for identifying when a first video is a content-identical variant of a second video. The first and second video each include a plurality of image frames, and the image frames of either the first video or the second video include at least one black border. A plurality of variants are generated of selected image frames of the first video and the second video. The variants are then compared to each other, and the first video is identified as being a variant of the second video when at least one match is detected among the variants.

14 Claims, 14 Drawing Sheets

210

START

↓

212 – Generate variants

↓

214 – Compare variants

↓

216 – Identify whether variant exists

↓

END

(56) References Cited

U.S. PATENT DOCUMENTS

| | | | |
|---|---|---|---|
| 2003/0185541 A1* | 10/2003 | Green | H04N 21/44008 |
| | | | 386/250 |
| 2013/0071034 A1 | 3/2013 | Kunkel et al. | |
| 2013/0094765 A1 | 4/2013 | Liu et al. | |
| 2015/0272546 A1 | 10/2015 | Cheon et al. | |
| 2017/0352100 A1 | 12/2017 | Shreve et al. | |
| 2018/0005387 A1 | 1/2018 | Lee et al. | |
| 2020/0007924 A1 | 1/2020 | Wu et al. | |

OTHER PUBLICATIONS

Wikipedia entry for "Canny edge detector." Printout from web page: <https://en.wikipedia.org/wiki/Canny_edge_detector>, printout date: Jul. 19, 2021, last edited date: Jul. 15, 2021, original posting date: unknown, 10 pages.

Demers et al., "What is the Aspect Ratio? (4:3, 16:9, 21:9)" Updated May 22, 2019, printout from: <https://www.rtings.com/tv/learn/what-is-the-aspect-ratio-4-3-16-9-21-9>, printout date: Jul. 16, 2019, 10 pages.

PHash: The open source perceptual hash library. Printout from phash.org, printout date: Aug. 18, 2021, Copyright © 2008-2010 Evan Klinger & David Starkweather, 3 pages.

Wikipedia entry for "Hamming distance" Printout from web page: <https://en.wikipedia.org/wiki/Hamming_distance>, printout date: Aug. 18, 2021, last edited date: Aug. 18, 2021, original posting date: unknown, 6 pages.

Wikipedia entry for "Minhash." Printout from web page: <https://en.wikipedia.org/wiki/MinHash>, printout date: Aug. 18, 2021, last edited date: Jul. 4, 2021, original posting date: unknown, 8 pages.

* cited by examiner

P₁

R₁

Aspect Ratio: A / B

Aspect Ratio (without black border): C / D

P1.1

P1.1.1　　　　　　　　P1.1.2　　　　　　　　P1.1.3

P1.2

P1.2.1                    P1.2.2                    P1.2.3

P1.3

P1.3.1 P1.3.2 P1.3.3

P1 = 1280 x 720 (16:9)　　　　　　P2 = 960 x 720 (4:3)

P1: 1280 x 720 (16:9)　　　　　　P1.1: 960 x 720 (4:3)

P1: 1280 x 720 (16:9)　　　　　　P1.2: 960 x 720 (4:3)

P1: 1280 x 720 (16:9)          P1.3: 960 x 720 (4:3)

P1.1: 960 x 720 (4:3)         P1.1.1: 960 x 540 (16:9)

P1.1: 960 x 720 (4:3)         P1.1.2: 960 x 540 (16:9)

P2.1: 960 x 540 (16:9)    P2.2: 960 x 540 (16:9)    P2.3: 960 x 540 (16:9)

P2.1.1: 720 x 540 (4:3)    P2.1.2: 720 x 540 (4:3)    P2.1.3: 720 x 540 (4:3)

P2.2.1: 720 x 540 (4:3)    P2.2.1: 720 x 540 (4:3)    P2.2.1: 720 x 540 (4:3)

P2.3.1: 720 x 540 (4:3)    P2.3.1: 720 x 540 (4:3)    P2.3.1: 720 x 540 (4:3)

P3: 1280 x 720 (16:9)

P3.1: 960 x 720 (4:3)　　　P3.2: 960 x 720 (4:3)　　　P3.3: 960 x 720 (4:3)

P3.1.1: 960 x 540 (16:9)　　P3.1.2: 960 x 540 (16:9)　　P3.1.3: 960 x 540 (16:9)

P3.2.1: 960 x 540 (16:9)　　P3.2.2: 960 x 540 (16:9)　　P3.2.3: 960 x 540 (16:9)

P3.2.3: 960 x 540 (16:9)　　P3.2.3: 960 x 540 (16:9)　　P3.2.3: 960 x 540 (16:9)

AUTOMATED METHOD AND APPARATUS FOR IDENTIFYING WHETHER A FIRST VIDEO IS A CONTENT-IDENTICAL VARIANT OF A SECOND VIDEO WHEN IMAGE FRAMES OF EITHER THE FIRST VIDEO OR THE SECOND VIDEO INCLUDE AT LEAST ONE BLACK BORDER

BACKGROUND OF THE INVENTION

Video contents come in every shape and size. The same content may be available in multiple formats with respect to video quality attributes, such as aspect ratio, brightness, contrast, multi-color, and monochromatic. In theory, every version (or variant) of specific video content can be considered unique and different, but for all practical and commercial purposes, they all are same video content.

For many video search systems, the presence of these content-identical variants poses challenges to effectively and uniquely search the content. For example, consider an advertisement or program content which has two variants, Variant-A and Variant-B, which differ from each other with respect to only their aspect ratio. It would not matter which of the two variants are streaming or airing on a TV feed, since they both provide the same content with respect to their commercial purpose. It is imperative that the video search system be able to match the two variants against each other. In other words, if Variant-B is airing or streaming (Variant-B being a sample video), and Variant-A is present in a reference search database (Variant-A being a reference video), then the video search system should be able to detect that Variant-A is airing or streaming, without Variant-B needing to be present in the reference search database.

The variance in several video attributes can be addressed through intelligent video processing of the videos, but there are a few attributes which require innovative ways to process them. One such variant has black borders on top, bottom, left and/or right edges. Specifically, this type of variant is the original video which is either cropped or is overlaid with a black border.

Accordingly, there is a need in the art to provide a system and method which would allow for intelligent and automatic detection and grouping such content-identical variants as a variants of a unique video content. The present invention fulfills such a need.

SUMMARY OF THE PRESENT INVENTION

An automated method is provided for identifying when a first video is a variant of a second video. The first and second video each include a plurality of image frames, and the image frames of either the first video or the second video include at least one black border. A plurality of variants are generated of selected image frames of the first video and the second video. The variants are then compared to each other, and the first video is identified as being a variant of the second video when at least one match is detected among the variants.

BRIEF DESCRIPTION OF THE DRAWINGS

Preferred embodiments of the present invention will now be described by way of example with reference to the accompanying drawings.

DETAILED DESCRIPTION OF THE INVENTION

Figure 1:
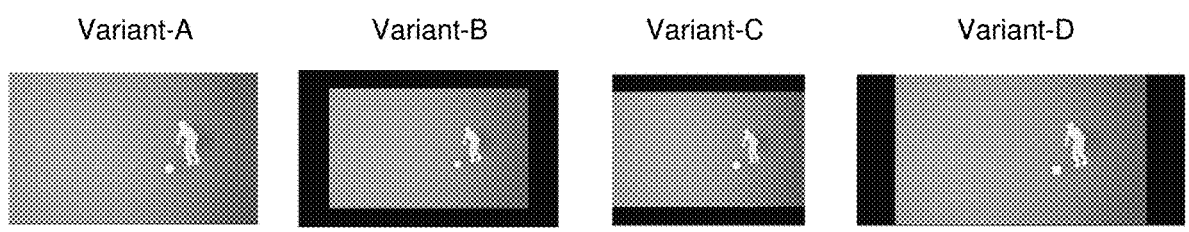
FIG. 1 shows variants of an image frame.

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

video—"video" as discussed herein refers to a stream of video images, also referred to in the art as "image frames" "still image frames" of video. The stream of video images may be part of video content which may be program content or commercial (advertisement) content. Video includes audio and visual portions. However, the present invention is concerned only with the visual portions in the frames of the video.

black borders (black bars)—These borders appear on a TV screen when video content having its original version in a first format or aspect ratio is displayed on a TV screen that has a different format or aspect ratio. For example, when film or video that was not originally designed for widescreen is shown on a widescreen display, the original material is shrunk and placed in the middle of the widescreen frame with black borders filling the edges of the TV screen. Likewise, similar issues arise when video recorded for a conventional 4:3 aspect ratio is shown on a widescreen display, or when video recorded for a widescreen display is shown on TV screen having a 4:3 aspect ratio. The black borders are thus not part of the original video content (image content). In some instances, an alternative color is used in place of black, and the scope of the present invention includes such alternative embodiments.

variant—One commonly accepted definition of "variant" is "a form or version of something that differs in some respect from other forms of the same thing or from a standard." (Oxford English Dictionary). A "variant" as defined herein is second video content of a second video that is identical to first video content of a first video (when comparing the second video to the first video) with respect to the video portion of the respective videos, wherein either the first or the second video has one or more black borders (black bars). Thus, the "same thing" in the dictionary definition above refers to having the same (identical) video content in the context of the present invention. A "variant" as defined herein is thus also interchangeably referred to as a "content-identical variant." The variant (second video) may have the same aspect ratio as the first video, or it may have a different aspect ratio than the first video. Table 1 below illustrates non-exhaustive examples of second video that would be deemed to be a variant of first video, wherein the video content is identified as being identical:

TABLE 1

| first video | second video |
| --- | --- |
| 16:9 aspect ratio; no black border | 4:3 aspect ratio; top and bottom black borders |
| 16:9 aspect ratio; no black border | 16:9 aspect ratio; top, bottom, left, and right edge black borders |
| 16:9 aspect ratio; no black border | 21:9 aspect ratio; left and right edge black borders |
| 16:9 aspect ratio; top, bottom, left, and right edge black borders | 4:3 aspect ratio; top and bottom black borders |
| 16:9 aspect ratio; top, bottom, left, and right edge black borders | 16:9 aspect ratio; no black borders |
| 21:9 aspect ratio: no black border | 16:9 aspect ratio; top and bottom black borders |
| 21:9 aspect ratio: no black border | 4:3 aspect ratio; top and bottom black borders |

The first and second video may also be reversed in the examples above when identifying variants of one or the other. That is, when referring to variants, when a second video is identified as being a variant of a first video, the first video may be described as being a variant of the second video.

Consider, for example, FIG. 1 which illustrates four different variants of the same video content. Variant A has a 16:9 aspect ratio and no black border. Variant B also has a 16:9 aspect ratio, but includes top, bottom, left, and right edge black borders. Variant C has a 4:3 aspect ratio and includes top and bottom black borders. Variant D has a 21:9 aspect ratio and includes left and right edge black borders. automatic content recognition (ACR)—(also referred to as "automated content recognition) ACR refers to identification technology to recognize content played on a media device or present in a media file. ACR systems are used in many applications to identify media content in an A/V feed.

II. Detailed Disclosure

Preferred embodiments of the system and method described herein uses a database of videos (stream of video images) which are kept in a proprietary searchable video database (Search DB). Each video (stream of video images) maintained in the Search DB is also referred to herein as a reference video or reference image (RefImage). The system receives (or is supplied with) video (another stream of video images) which needs to be searched in the Search DB. Such video (stream of video images) is referred to herein as probe video or image (ProbeImage). The system accurately matches a ProbeImage against a RefImage, and identifies whether the ProbeImage is a variant of a RefImage, even if either of them has black borders on one or more their edges. Such a system can automatically detect and group such video contents, thus making it easier for the video search (video ACR) system to work effectively finding such contents.

Figure 2:
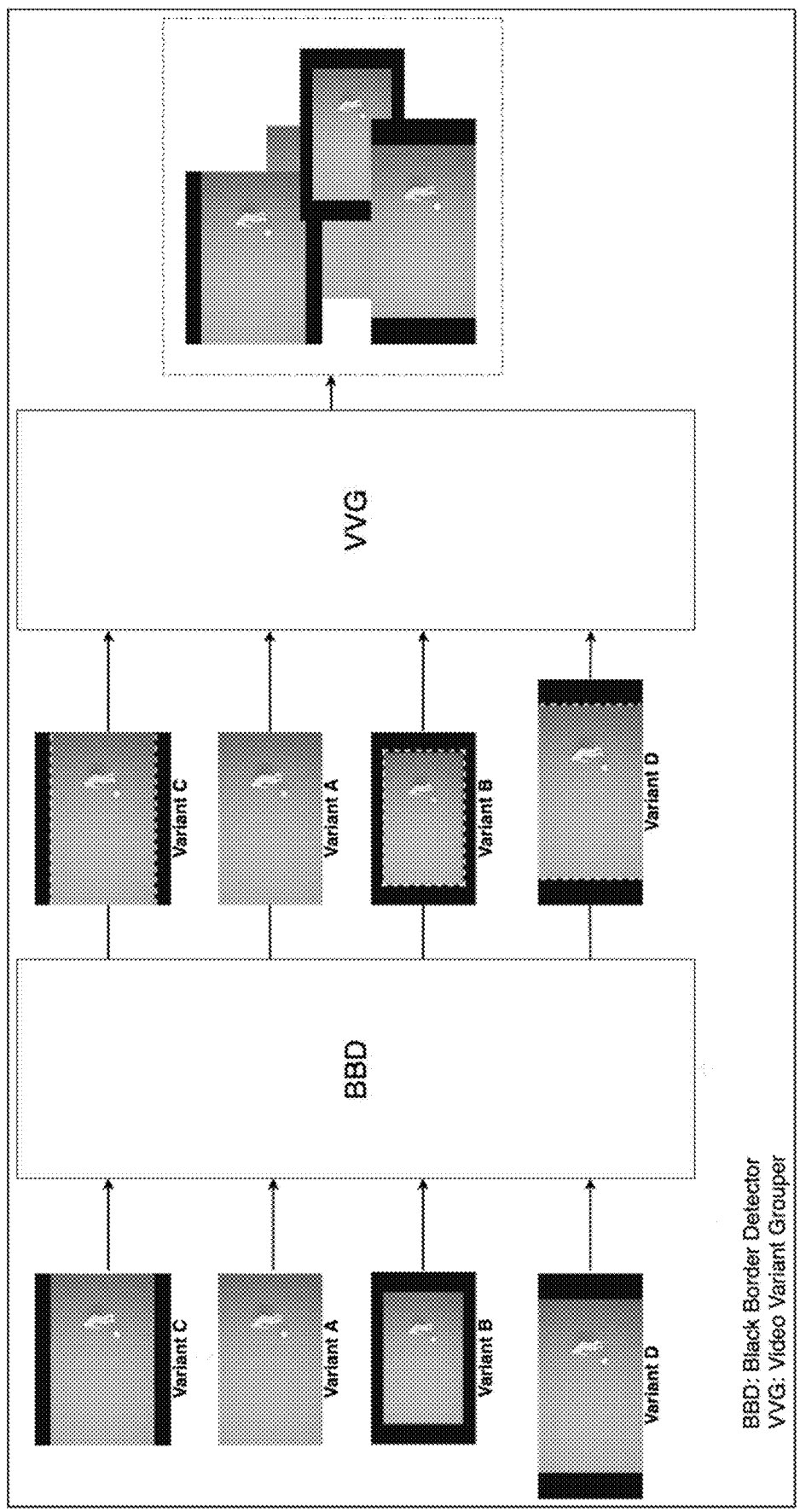
FIG. 2 shows a schematic diagram of a system for implementing preferred embodiments of the present invention.

Referring to FIG. 2, at a high level, the system has two major components, namely, a Black Border Detector (BBD) and a Video Variant Grouper (VVG).

Black border detection is well-known in the art, and any suitable process may be used for such purposes. See, for example, U.S. Patent Application Publication No. 2020/0007924 (Wu et al.); U.S. Patent Application Publication No. 2013/0094765 (Liu et al.); and U.S. Pat. No. 6,947,097 (Joanblanq), each of which are incorporated herein by reference. One particularly suitable black border detection process is described in U.S. application Ser. No. 17/477,171 filed Sep. 16, 2021, entitled "Automated method for detecting black borders in an image frame", which is also incorporated herein by reference.

One preferred embodiment of video variant grouping (detection of video variants) is performed using the following steps.

Figure 3:
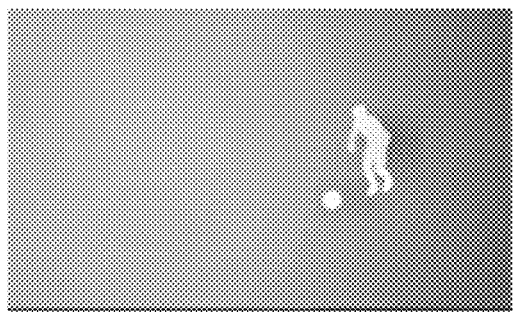
FIGS. 3-19 show additional variants of image frames for implementing preferred embodiments of the present invention.
Figure 3:
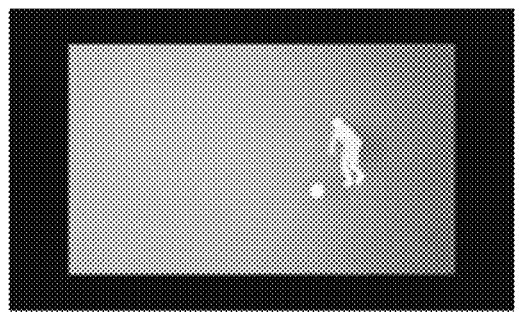

Step 1: Analyze the ProbeImage (P1) and RefImage (R1) to determine if they have a black border. For simplicity sake, assume the following two images P1 and R1 shown in FIG. 3. It would not matter which of the variants are being processed, and also whether the probe is interchanged with reference.

Figure 4:
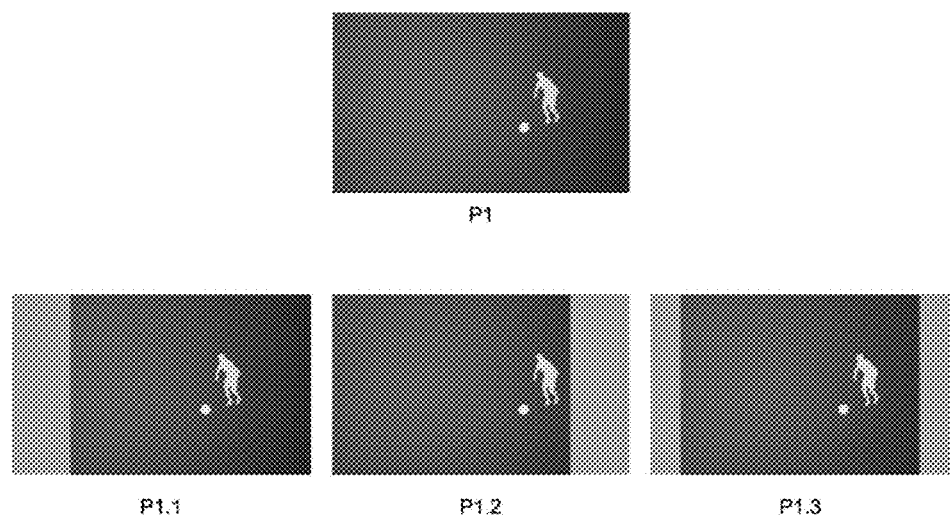

Step 2: Referring to FIG. 4, generate 3 variants for the reference and the probe through horizontal clipping. The gray borders in FIG. 4, in comparison with the black borders in the other figures, indicates that the borders are cropped out (removed) before the processing occurs for matching these variants against the probe. The black borders in the other figures do not represent borders that are cropped out (removed.)

1. P1.1—crop left edge by $[a-(b \times c)/(d)]$
2. P1.2—crop right edge by $[a-(b \times c)/(d)]$
3. P1.3—crop left and right edges by $[a-(b \times c)/(d)]/2$ Here a, b, c and d refer to width and height of two images respectively.

Original image (e.g., P1) is of dimensions $(a \times b)$ and it is desired to generate a variant of dimensions $(c \times d)$. Consequently, the aspect ratio of P1 will be $a/b$ and that of its generated variant will be $c/d$.

Figure 5:
Figure 5:
Figure 5:
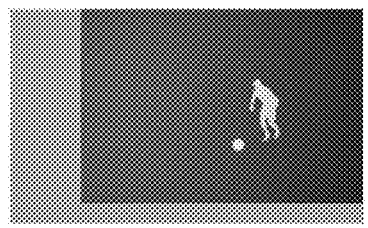
Figure 5:
Figure 6:
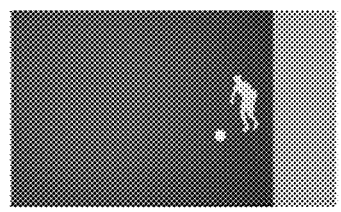
Figure 6:
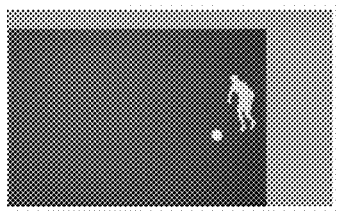
Figure 6:
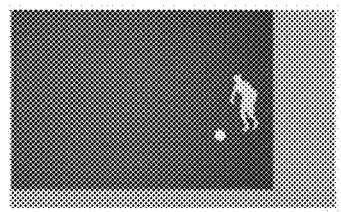
Figure 6:
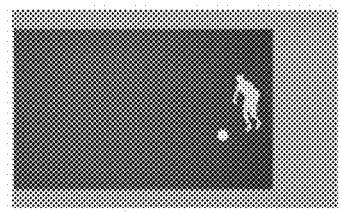
Figure 7:
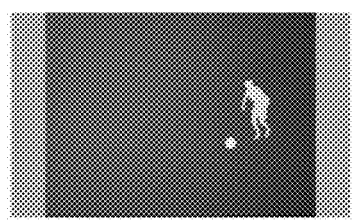
Figure 7:
Figure 7:
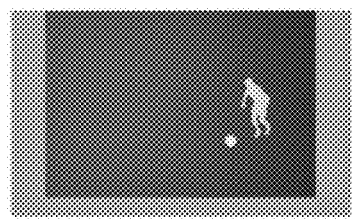
Figure 7:
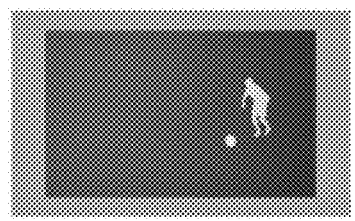

Step 3: Referring to FIGS. 5-7, generate 9 variants through vertical clipping. Again, the gray borders in FIG. 4, in comparison with the black borders in the other figures, indicates that the borders are cropped out (removed) before the processing occurs for matching these variants against the probe.

1. P1.1.1: crop P1.1 top edge by $[d-(b \times c)/a]$
2. P1.1.2: crop P1.1 bottom edge by $[d-(b \times c)/a]$
3. P1.1.3: crop P1.1 top and bottom edges by $[d-(b \times c)/a]/2$
4. P1.2.1: crop P1.2 top edge by $[d-(b \times c)/a]$
5. P1.2.2: crop P1.2 bottom edge by $[d-(b \times c)/a]$
6. P1.2.3: crop P1.2 top and bottom edges by $[d-(b \times c)/a]/2$
7. P1.3.1: crop P1.3 top edge by $[d-(b \times c)/a]$
8. P1.3.2: crop P1.3 bottom edge by $[d-(b \times c)/a]$
9. P1.3.3: crop P1.3 top and bottom edges by $[d-(b \times c)/a]/2$ FIG. 5 shows the variants of P1.1, FIG. 6 shows the variants of P1.2, and FIG. 7 shows the variants of P1.3.

Step 4: Repeat step 2 and step 3 for RefImage (R1), and thereby generate R1.1.1, R1.1.2, . . . , R.1.3.2 and R1.3.3, respectively.

Step 5: Maintain the set of images {P1, P1.x.y} as a variant of a single image. Similarly, maintain that the set of images {R1, R1.x.x} is a variant of another unique image.

Step 6: Using a Video ACR/Image Comparison Algorithm, compare all members of set {P1, P1.x, P1.x.x} with all members of {R1, R1.x, R1.x.x}. If any of the two members match, the system can declare that the two images are same (i.e., variants of one another having the same video content).

One suitable Video ACR/Image Comparison Algorithm makes hashes (fingerprints) of video frames and then compares these hashes. For hashing, one can use pHash (perceptual hash) which is a fingerprint of a multimedia file derived from various features from its content. For the comparison, one can compare the "phashes" for various video frames. The parameter used for comparing is Hamming distance. Another suitable algorithm for comparing videos uses MinHash.

In certain scenarios, the operational (time and space) complexity of such a system may render the system difficult to implement. One workaround is to assume that both edges are covered with black border equally and hence the both probe and reference image sets can be reduced to {P1, P1.3, P1.3.1, P1.3.2, P1.3.3} and {R1, R1.3, R1.3.1, R1.3.2, R1.3.3}.

Further, variants R1.x, and R.1.x.x can be generated using standard and popular aspect ratios used in various Television Channel feeds or streaming services.

A video comprises a large number of images. To further scale the system, one can safely assume that black borders would be present on all images uniformly. To compare the two video clips, one can extend the algorithm by considering a set of images at the scene-change boundaries (Pa, Pb, . . . ) and generate corresponding variants for each of them {Pa, Pa.x, Pa.x.x, Pb, Pb.x, Pb.x.x, . . . ), which can then be compared with each other to find the match.

Figure 16:
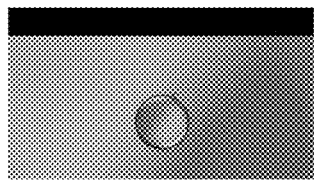
Figure 16:
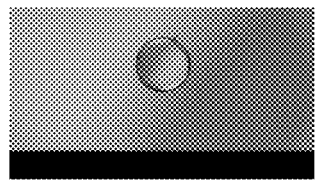
Figure 16:
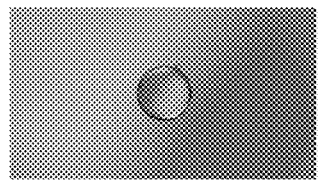
Figure 17:
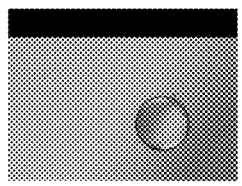
Figure 17:
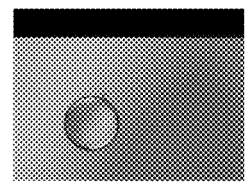
Figure 17:
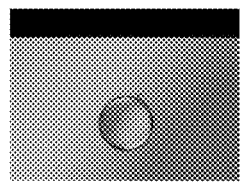
Figure 17:
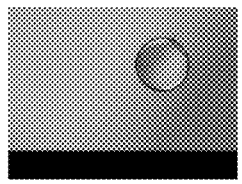
Figure 17:
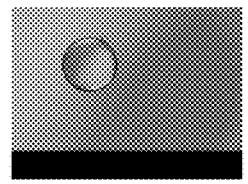
Figure 17:
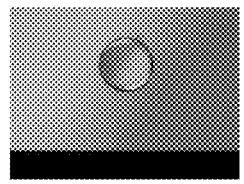
Figure 17:
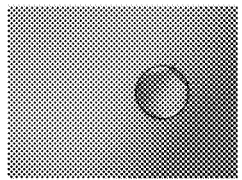
Figure 17:
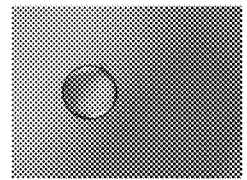
Figure 17:
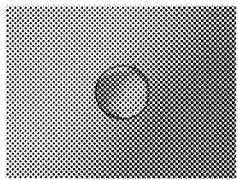
Figure 18:
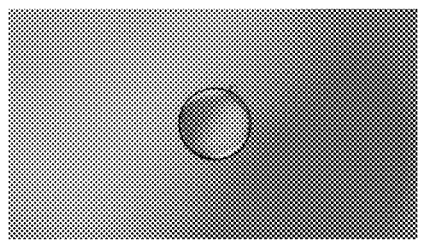
Figure 19:
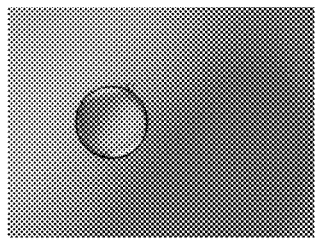
Figure 19:
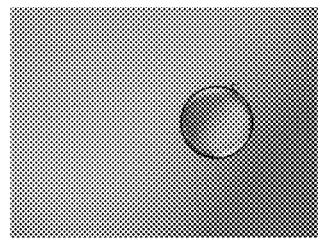
Figure 19:
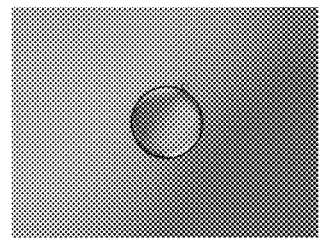
Figure 19:
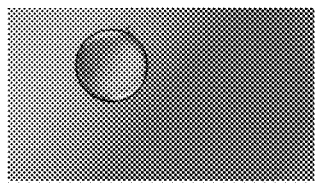
Figure 19:
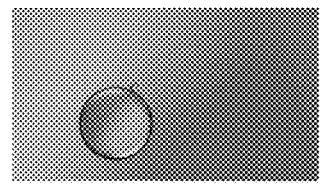
Figure 19:
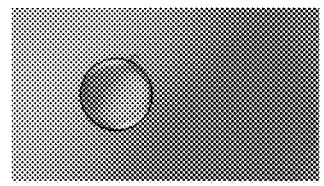
Figure 19:
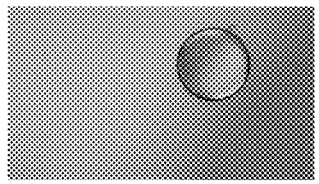
Figure 19:
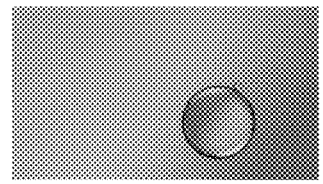
Figure 19:
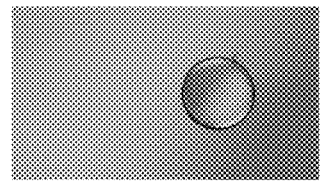
Figure 19:
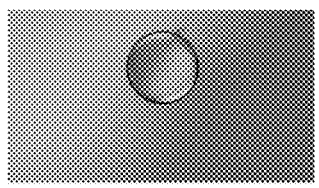
Figure 19:
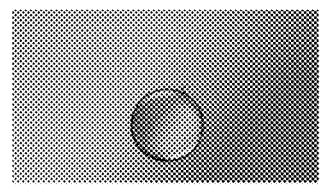
Figure 19:
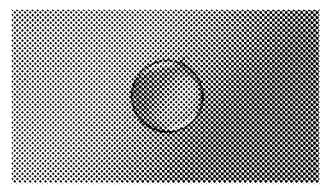

FIGS. 8-19 illustrate sample use cases. FIGS. 8-17 illustrate one sample use case, and FIGS. 18-19 illustrates another sample use case.

Figure 8:
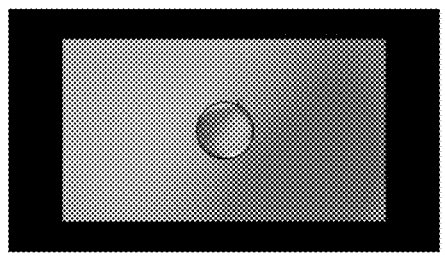
Figure 8:
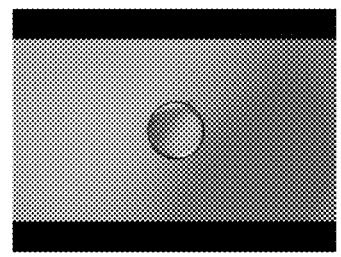
Figure 9:
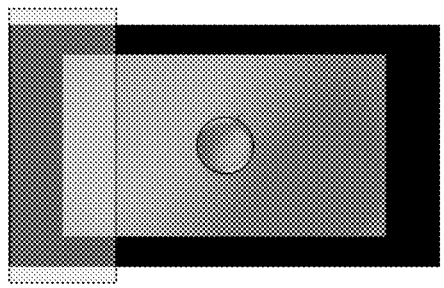
Figure 9:
Figure 9:
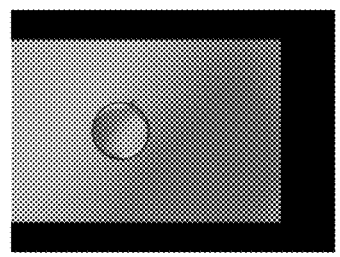

Referring to FIG. 8, consider that one needs to check if the two images in FIG. 8 differ only because of black borders. To do so, image P1 having an aspect ratio of 16:9 needs to be converted to the aspect ratio of image P2, which is 4:3. This can be done by either cropping P1 from left, from right or equally from both sides. This results in the following three variants of P1 shown in the following respective figures:

FIG. 9: P1.1—Crop from left by: [a−(b×c)/(d)]=[1280−(720×4)/3]=320

Figure 10:
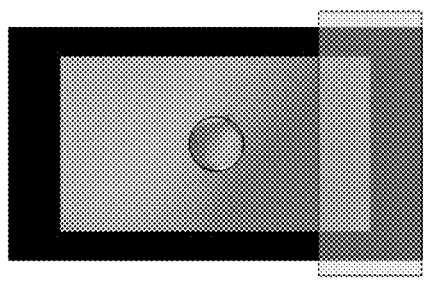
Figure 10:
Figure 10:
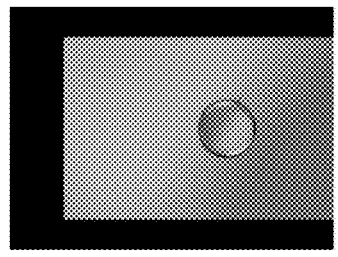

FIG. 10: P1.2—Crop from right by: [a−(b×c)/(d)]=[1280−(720×4)/3]=320

Figure 11:
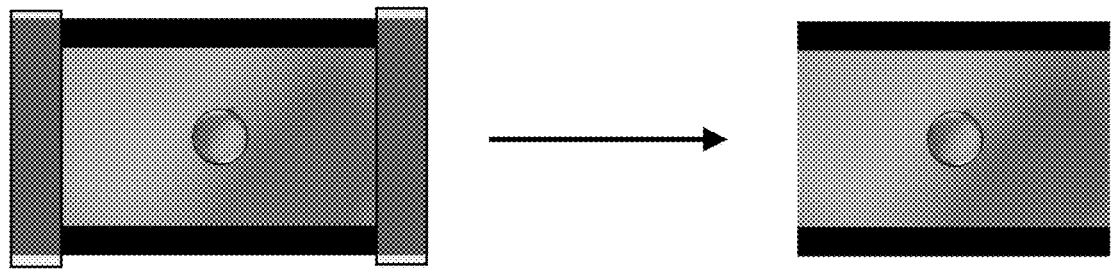

FIG. 11: P1.3—Crop from left and right by: [a−(b×c)/(d)]/2=[1280−(720×4)/3]/2=160

Next, crop these new variants (P1.1, P1.2, P1.3) from top and/or bottom to generate 3 more variants from each of them.

Amount to be cropped=[d−(b×c)/a]=[720−(960*9)/16]=180.

Figure 12:
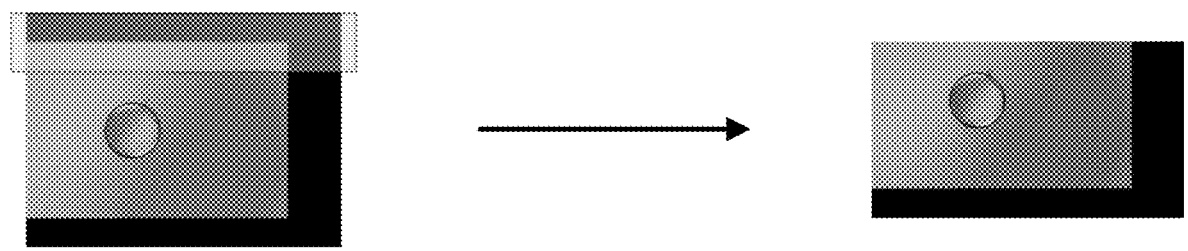
Figure 13:
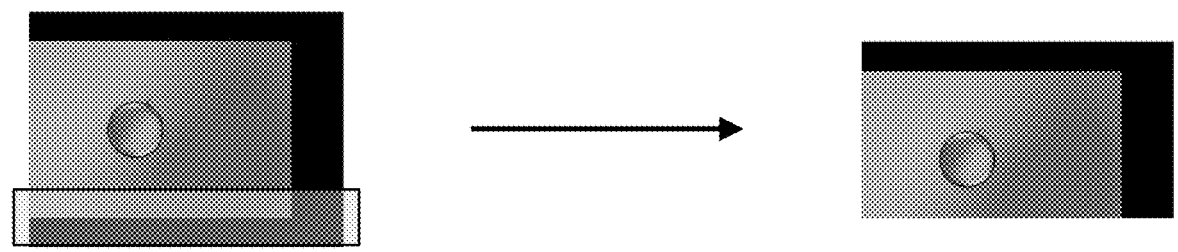
Figure 14:
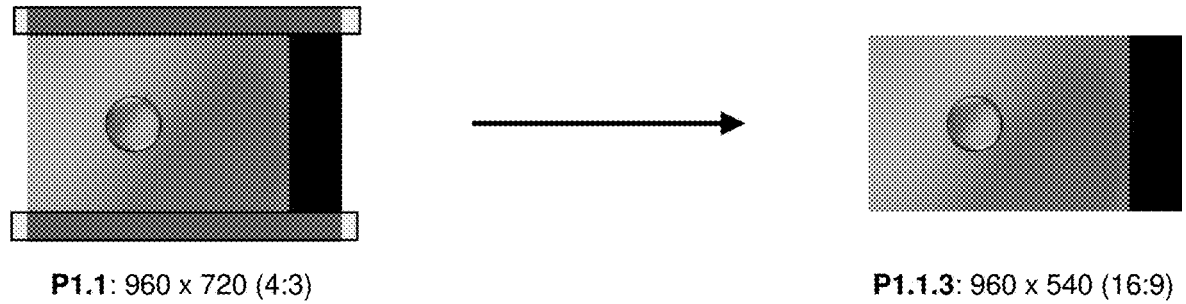

For P1.1, new variants will be as follows:
FIG. 12: P1.1.1—Crop 180 from top.
FIG. 13: P1.1.2—Crop 180 from bottom:
FIG. 14: P1.1.3—Crop 90 each from top and bottom.

Figure 15:
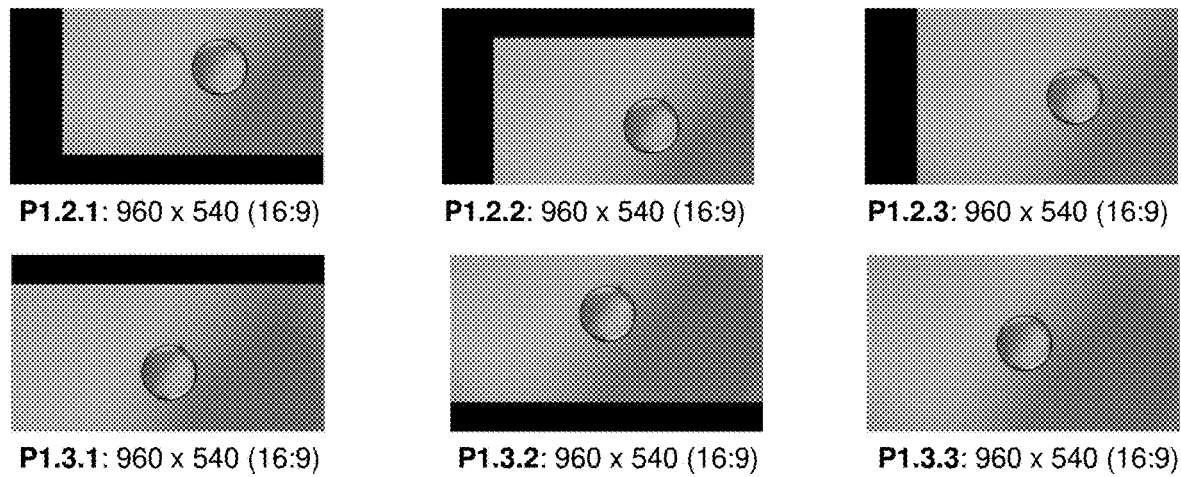

Similarly, three more variants will be created from P1.2 and three from P1.3. They are shown in FIG. 15.

Next, crop P2 from top and bottom to generate P2.1, P2.2 and P2.3 of dimensions 960×540 to change them to 16:9 aspect ratio (that of P1). They are shown in FIG. 16. Now, each of these P2.1, P2.2 and P2.3 needs to be cropped from left and right to change them to 4:3 resolution. They are shown in FIG. 17.

At this point, there are now 12 variants and 1 original image for each of the two images. Next, compare each image from one set (one image and its 12 variants) to each image from the other set. If any of these pairs match, then one can conclude that these two images differ only due to presence of black borders, otherwise they are identical.

In this example, following image pairs will match:
P1.3 (shown in FIG. 11) will match P2 (shown in FIG. 8)
P1.3.3 (shown in FIG. 15) will match P2.3 (shown in FIG. 16)

Thus, one can conclude that P1 and P2 only differ due to presence of black borders.

Consider another sample use case wherein image P3 shown in FIG. 18 needs to be compared against P1 shown in FIG. 8. To do so, one makes the same 12 variants of P3, shown in FIG. 19, and compares them against 12 variants and the image of P1 (P1, P1.1, P1.2, P1.3, P1.1.1, . . . , P1.3.3).

In this case following image pairs will match:
P1.3.3 (shown in FIG. 15) will match with P3 (shown in FIG. 18)

One can again conclude that P1 and P3 differ only because of presence of black borders, otherwise they are identical in video content.

Figure 20:
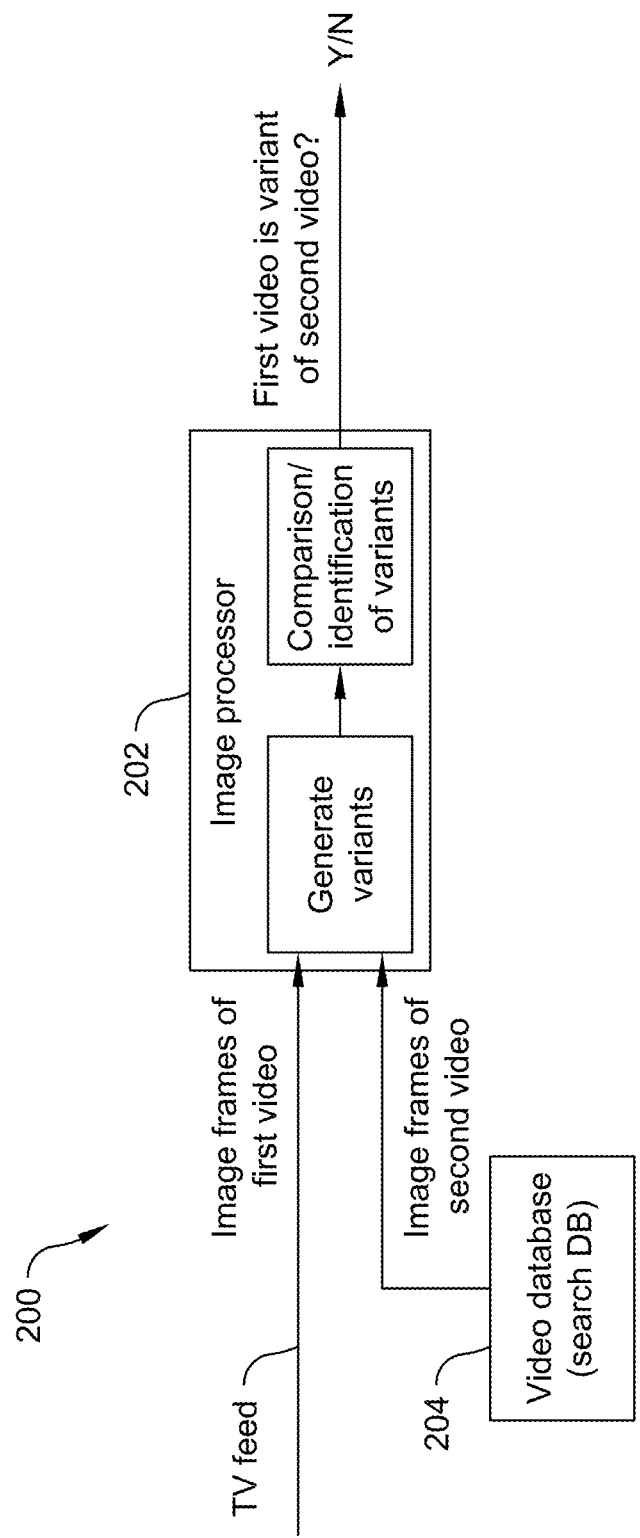
FIG. 20 is a schematic diagram of a system (apparatus) for implementing preferred embodiments of the present invention.

FIG. 20 is a schematic diagram of a system (apparatus) 200 for implementing one preferred embodiment of the present invention. The system 200 includes an image processor 202 which receives image frames of a first video and image frames of a second video. As discussed above, the image frames of the second video (RefImages) may be stored in a video database (Search DB) 204. The image processor 202 performs the functions of generating variants using the algorithms discussed above, performing comparisons between variants of the first and second image frames, and identifying whether a variant has been detected.

Figure 21:
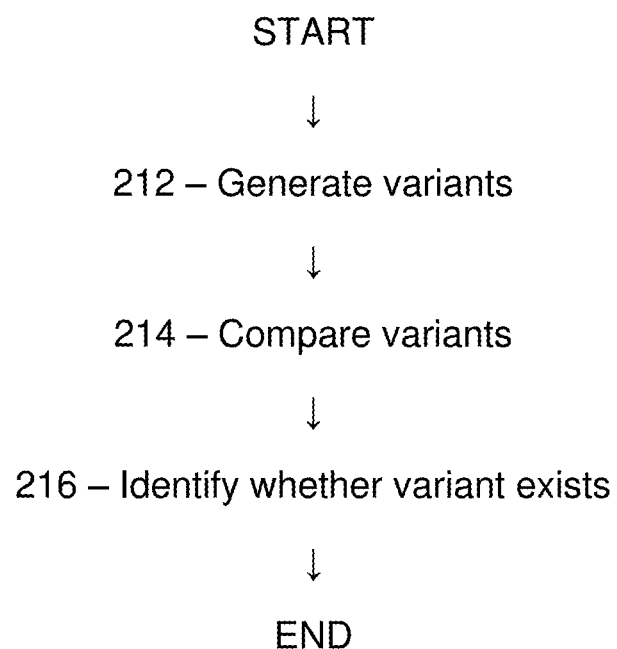
FIG. 21 is flowchart of one preferred embodiment of the present invention.

FIG. 21 is a flowchart of an automated method 210 for identifying when a first video is a variant of a second video, as implemented with the system 200 and the algorithms described above. The first and second video each include a plurality of image frames, and the image frames of either the first video or the second video include at least one black border. The method includes the following steps:

Step 212: Generate a plurality of variants of selected image frames of the first video and the second video, using the image processor 202. The variants of the selected image frames of the first video and the second video include the following variants:

(i) a plurality of horizontally clipped images frames that include one or more of cropped left and cropped right edges, and (ii) a plurality of vertically clipped image frames that include one or more of cropped top and cropped bottom edges.

The same variants are created for the image frames of the first video and the second video. In one preferred embodiment, the selected image frames are image frames that occur at scene change boundaries of the respective first and second video.

Step 214: Electronically compare, using the image processor 202, each of the variants of the image frames of the first video with (A) each of the variants of the image frames of the second video, and (B) the image frame of the second video, and detect any matching image frame variants. Also, electronically compare, using the image processor 202, each of the variants of the image frames of the second video with (A) each of the variants of the image frames of the first video, and (B) the image frame of the first video, and detect any matching image frame variants.

Step 216: Electronically identify, using the image processor 202, that the first video is a variant of the second video when at least one match is detected in either of the comparisons performed in step 214.

In one preferred embodiment, the first video and its respective image frames have a first aspect ratio, and the second video and its respective image frames have a second aspect ratio, and the amount of cropping performed on the variants of the first image frame is determined by the the second aspect ratio, and the amount of cropping performed on the variants of the second image frame is determined by the first aspect ratio. For example, the amount of cropping may be based on the amount of cropping needed to achieve an aspect ratio of either 4:3 or 16:9. If the first and second video have the same aspect ratio, then one of these two aspect ratios can be used for the cropping.

In one preferred embodiment, the plurality of horizontally clipped images frames include (i) one image frame having a cropped left edge, (ii) one image frame having a cropped right edge, and (iii) one image frame having a cropped left and right edge. The plurality of vertically clipped image frames may be generated using the one image frame having a cropped left edge, the one image frame having a cropped right edge, and the one image frame having a cropped left and right edge. More specifically, the plurality of vertically clipped image frames that are generated using the one image frame having a cropped left edge include (i) one image frame having a cropped top edge, (ii) one image frame having a cropped bottom edge, and (iii) one image frame having a cropped top and bottom edge; the plurality of vertically clipped image frames that are generated using the one image frame having a cropped right edge include (i) one image frame having a cropped top edge, (ii) one image frame having a cropped bottom edge, and (iii) one image frame having a cropped top and bottom edge; and the plurality of vertically clipped image frames that are generated using the one image frame having a cropped left and right edge include (i) one image frame having a cropped top edge, (ii) one image frame having a cropped bottom edge, and (iii) one image frame having a cropped top and bottom edge.

III. Additional Considerations

Sampling rate of selected image frames: The image frames which are selected for generating the plurality of variants may be selected in any number of ways. In one embodiment, sampling may occur every few seconds for both the ProbeImage (P1) and the RefImage (R1). The sample used for the comparison should have matching timestamps from the respective beginning of the videos.

In another embodiment, sampling occurs at scene changes. This requires detecting a scene changes and then selecting image frames at the scene change boundaries. Scene change detection (also, referred to as "shot change detection") is well-known in the art and any suitable scene change detection process may be used for this purpose. See, for example, U.S. Pat. No. 6,985,623 (Prakash et al.) which is incorporated by reference herein, and which describes multiple techniques.

Preferably, sampling should occur throughout P1 and R1 to ensure that the entire video content is identical. For example, if P1 is a shortened or modified version of R1 with respect to the video content, sampling at only the first scene change, or first few seconds would not provide an accurate result since these portions of the video may be identical, but remaining portions may be different.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof.

It is understood, therefore, that this invention is not limited to the particular embodiments disclosed, but it is intended to cover modifications within the spirit and scope of the present invention.

What is claimed is:

1. An automated method for identifying when a first video is a content-identical variant of a second video, the first and second video each including a plurality of image frames, and wherein the image frames of either the first video or the second video include at least one black border, the method comprising:
   (a) generating a plurality of variants of selected image frames of the first video and the second video, using an image processor, wherein the variants of the selected image frames of the first video and the second video include the following variants:
      (i) a plurality of horizontally clipped images frames that include one or more of cropped left and cropped right edges, and
      (ii) a plurality of vertically clipped image frames that include one or more of cropped top and cropped bottom edges,
   wherein the same variants are created for the image frames of the first video and the second video;
   (b) electronically comparing, using the image processor:
      (i) each of the variants of the image frames of the first video with (A) each of the variants of the image frames of the second video, and (B) an image frame of the second video, and detecting any matching image frame variants, and
      (ii) each of the variants of the image frames of the second video with (A) each of the variants of the image frames of the first video, and (B) an image frame of the first video, and detecting any matching image frame variants; and
   (c) electronically identifying, using the image processor, that the first video is a content-identical variant of the second video when at least one match is detected in either step (b)(i) or (b)(ii).

2. The method of claim 1 wherein the plurality of horizontally clipped images frames include (i) one image frame having a cropped left edge, (ii) one image frame having a cropped right edge, and (iii) one image frame having a cropped left and right edge.

3. The method of claim 2 wherein the plurality of vertically clipped image frames are generated using the one image frame having a cropped left edge, the one image frame having a cropped right edge, and the one image frame having a cropped left and right edge.

4. The method of claim 3 wherein the plurality of vertically clipped image frames that are generated using the one image frame having a cropped left edge include (i) one image frame having a cropped top edge, (ii) one image frame having a cropped bottom edge, and (iii) one image frame having a cropped top and bottom edge, and
   wherein the plurality of vertically clipped image frames that are generated using the one image frame having a cropped right edge include (i) one image frame having a cropped top edge, (ii) one image frame having a cropped bottom edge, and (iii) one image frame having a cropped top and bottom edge, and
   wherein the plurality of vertically clipped image frames that are generated using the one image frame having a cropped left and right edge include (i) one image frame having a cropped top edge, (ii) one image frame having a cropped bottom edge, and (iii) one image frame having a cropped top and bottom edge.

5. The method of claim 1 wherein the first video and its respective image frames have a first aspect ratio, and the second video and its respective image frames have a second aspect ratio, and the amount of cropping performed on the variants of the first image frame is determined by the the second aspect ratio, and the amount of cropping performed on the variants of the second image frame is determined by the first aspect ratio.

6. The method of claim 1 wherein the selected image frames are image frames that occur at scene change boundaries of the respective first and second video.

7. The method of claim 1 wherein the amount of cropping is based on the amount of cropping needed to achieve an aspect ratio of either 4:3 or 16:9.

8. An apparatus for identifying when a first video is a content-identical variant of a second video, the first and second video each including a plurality of image frames, and wherein the image frames of either the first video or the second video include at least one black border, the apparatus comprising an image processor configured to:
  (a) generate a plurality of variants of selected image frames of the first video and the second video, using an image processor, wherein the variants of the selected image frames of the first video and the second video include the following variants:
    (i) a plurality of horizontally clipped images frames that include one or more of cropped left and cropped right edges, and
    (ii) a plurality of vertically clipped image frames that include one or more of cropped top and cropped bottom edges,
  wherein the same variants are created for the image frames of the first video and the second video;
  (b) electronically compare:
    (i) each of the variants of the image frames of the first video with (A) each of the variants of the image frames of the second video, and (B) an image frame of the second video, and detecting any matching image frame variants, and
    (ii) each of the variants of the image frames of the second video with (A) each of the variants of the image frames of the first video, and (B) an image frame of the first video, and detecting any matching image frame variants; and
  (c) electronically identify that the first video is a content-identical variant of the second video when at least one match is detected in either step (b)(i) or (b)(ii).

9. The apparatus of claim 8 wherein the plurality of horizontally clipped images frames include (i) one image frame having a cropped left edge, (ii) one image frame having a cropped right edge, and (iii) one image frame having a cropped left and right edge.

10. The apparatus of claim 9 wherein the plurality of vertically clipped image frames are generated using the one image frame having a cropped left edge, the one image frame having a cropped right edge, and the one image frame having a cropped left and right edge.

11. The apparatus of claim 10 wherein the plurality of vertically clipped image frames that are generated using the one image frame having a cropped left edge include (i) one image frame having a cropped top edge, (ii) one image frame having a cropped bottom edge, and (iii) one image frame having a cropped top and bottom edge, and
  wherein the plurality of vertically clipped image frames that are generated using the one image frame having a cropped right edge include (i) one image frame having a cropped top edge, (ii) one image frame having a cropped bottom edge, and (iii) one image frame having a cropped top and bottom edge, and
  wherein the plurality of vertically clipped image frames that are generated using the one image frame having a cropped left and right edge include (i) one image frame having a cropped top edge, (ii) one image frame having a cropped bottom edge, and (iii) one image frame having a cropped top and bottom edge.

12. The apparatus of claim 8 wherein the first video and its respective image frames have a first aspect ratio, and the second video and its respective image frames have a second aspect ratio, and the amount of cropping performed on the variants of the first image frame is determined by the the second aspect ratio, and the amount of cropping performed on the variants of the second image frame is determined by the first aspect ratio.

13. The apparatus of claim 8 wherein the selected image frames are image frames that occur at scene change boundaries of the respective first and second video.

14. The apparatus of claim 8 wherein the amount of cropping is based on the amount of cropping needed to achieve an aspect ratio of either 4:3 or 16:9.

* * * * *